(12) United States Patent
Vaillant

(10) Patent No.: US 9,965,070 B2
(45) Date of Patent: May 8, 2018

(54) SYSTEM AND METHOD FOR DETECTING THE POSITION OF AN ACTUATION MEMBER ON A DISPLAY SCREEN

(71) Applicants: Commissariat à l'énergie atomique et aux énergies alternatives, Paris (FR); ISORG, Grenoble (FR)

(72) Inventor: Jérôme Vaillant, Grenoble (FR)

(73) Assignees: Commissariat à l'énergie atomique et aux énergies alternatives, Paris (FR); ISORG, Grenoble (FR)

( * ) Notice: Subject to any disclaimer, the term of this patent is extended or adjusted under 35 U.S.C. 154(b) by 243 days.

(21) Appl. No.: 14/760,730

(22) PCT Filed: Jan. 14, 2014

(86) PCT No.: PCT/FR2014/050067
§ 371 (c)(1),
(2) Date: Jul. 14, 2015

(87) PCT Pub. No.: WO2014/111650
PCT Pub. Date: Jul. 24, 2014

(65) Prior Publication Data
US 2015/0355784 A1    Dec. 10, 2015

(30) Foreign Application Priority Data

Jan. 15, 2013 (FR) ..................... 13 50350

(51) Int. Cl.
*G06F 3/041* (2006.01)
*G06F 3/0354* (2013.01)
(Continued)

(52) U.S. Cl.
CPC ........ *G06F 3/0412* (2013.01); *G06F 3/03545* (2013.01); *G06F 3/0418* (2013.01);
(Continued)

(58) Field of Classification Search
CPC ............ G06F 3/03545; G06F 3/04886; G06F 3/0416; G06F 3/017; G06F 3/03547;
(Continued)

(56) References Cited

U.S. PATENT DOCUMENTS 8,368,663 B2 * 2/2013 Izadi ................ G06F 3/0421
178/18.09
2008/0122803 A1    5/2008 Izadi et al.
(Continued)

FOREIGN PATENT DOCUMENTS

EP    1610210 A1    12/2005
FR    1158607 A     6/1958
(Continued)

OTHER PUBLICATIONS

"International Search Report" issued in counterpart International Application No. PCT/FR2014/050067, dated Mar. 13, 2013.
(Continued)

*Primary Examiner* — Duc Dinh
(74) *Attorney, Agent, or Firm* — Kaplan Breyer Schwarz, LLP

(57) ABSTRACT

The invention relates to a method including the steps of: displaying first successive images on a screen; acquiring at least one second image; searching for the position of at least one actuation member relative to the screen based on an analysis of the second image; and modifying at least one of the next first images to be displayed if conditions of determination of the position of the actuation member in the second image are only partially fulfilled.

8 Claims, 3 Drawing Sheets

(51) Int. Cl.
  *G06F 3/0488* (2013.01)
  *G06F 3/042* (2006.01)
  *G06T 7/73* (2017.01)

(52) U.S. Cl.
  CPC .......... *G06F 3/0421* (2013.01); *G06F 3/0488* (2013.01); *G06T 7/73* (2017.01); *G06F 2203/04104* (2013.01); *G06F 2203/04808* (2013.01)

(58) Field of Classification Search
  CPC ........... G06F 3/0425; G06F 2203/0331; G06F 2203/04807; G06F 3/0421; G06F 3/042; G06F 2203/04104; G06F 2203/04109; G06F 3/0304; G06F 3/0346; G09G 2300/026; G09G 2310/04; G09G 2354/00; G09G 2370/022; G09G 2380/02; G09G 2380/14; G09G 3/3648; G09G 5/00
  USPC .......................................... 345/173–175, 181
  See application file for complete search history.

(56) References Cited

U.S. PATENT DOCUMENTS

| | | | |
|---|---|---|---|
| 2010/0007632 A1* | 1/2010 | Yamazaki | G06F 3/0421 345/175 |
| 2010/0013793 A1 | 1/2010 | Abileah et al. | |
| 2010/0053348 A1* | 3/2010 | Yoshimoto | G06F 3/0412 348/218.1 |
| 2011/0298909 A1 | 12/2011 | Ando et al. | |

FOREIGN PATENT DOCUMENTS

| | | |
|---|---|---|
| FR | 1258546 A | 4/1961 |
| WO | 2011119483 A1 | 9/2011 |

OTHER PUBLICATIONS

"Written Opinion of the International Searching Authority", dated Jul. 15, 2015, issued in counterpart International Patent Application No. PCT/FR2014/050067.

* cited by examiner

SYSTEM AND METHOD FOR DETECTING THE POSITION OF AN ACTUATION MEMBER ON A DISPLAY SCREEN

The present patent application claims the priority benefit of French patent application FR13/50350 which is herein incorporated by reference.

BACKGROUND

The present application relates to a device and a method for detecting the position of an actuation member on a display screen.

DISCUSSION OF THE RELATED ART

There exist user interface systems comprising a display screen and a device for detecting the position of an actuation member, for example, a stylus, a user's finger or hand, on the display screen. The detection device may comprise a touch-sensitive surface, or touch surface, which may be superimposed to a display screen. The user interface system is then generally called touch screen.

Touch screens are currently used in many fields. As an example, they have already been used to control cells phones, computers, television sets, motor vehicles, automated ticketing machines, industrial equipment, medical equipment, etc.

Patent application WO 2011/119483 describes an example of a user interface system comprising a display screen and a device for detecting an actuation member comprising light-emitting diodes and photodetectors arranged on the screen edges to detect the presence of the actuation member.

Publication "Active Matrix LCD with Integrated Optical Touch Screen" of W. den Boer, A. Abileah, P. Green, T. Larsson, S. Robinson, and T. Nguyen (SID 03 DIGEST) describes a liquid crystal display screen which integrates optical sensors used to detect the shadow of an actuation member on the screen.

SUMMARY

Thus, an embodiment provides a method comprising the steps of:

displaying first successive images on a screen;
acquiring at least one second image;
searching for the position of at least one actuation member with respect to the screen based on an analysis of the second image; and
modifying at least one of the next first images to be displayed if conditions of determination of the position of the actuation member in the second image are only partially fulfilled.

According to an embodiment, the second image corresponds to the image of the light reaching the screen.

According to an embodiment, the intensity of at least certain pixels of the next first image to be displayed is increased or decreased.

According to an embodiment, a portion only of the next first image to displayed is modified.

According to an embodiment, the second image is a color image comprising at least two sub-images associated with different colors.

According to an embodiment, the position of the actuation member with respect to the screen is searched for based on the detection of the reflection of the first image by the actuation member in each sub-image.

According to an embodiment, the method comprises searching in each sub-image for at least one first given pattern representative of the reflection of the first image by the actuation member.

According to an embodiment, the conditions of determination of the position of the actuation member relative to the screen are fulfilled if the reflection of the first image by the actuation member is detected at the same position in each sub-image.

According to an embodiment, the conditions of determination of the position of the actuation member relative to the screen are only partially fulfilled if the reflection of the first image by the actuation member is detected in at least one of the sub-images and is not detected in all sub-images.

According to an embodiment, the position of the actuation member relative to the screen is searched for based on the detection of the shadow of the actuation member in each sub-image.

According to an embodiment, the method comprises searching in each sub-image for at least one second given pattern representative of the shadow of the actuation member.

According to an embodiment, the conditions of determination of the position of the actuation member relative to the screen are fulfilled if the shadow of the actuation member is detected at the same position in each sub-image.

According to an embodiment, the conditions of determination of the position of the actuation member relative to the screen are only partially fulfilled if the shadow of the actuation member is detected in one of the sub-images and is not detected in all sub-images.

An embodiment also provides a system comprising:
a screen for displaying first successive images;
a device for acquiring at least one second image;
a device for searching for the position of at least one actuation member relative to the screen, based on an analysis of the second image; and
a device for modifying the next first image to be displayed if conditions of determination of the position of the actuation member in the second image are only partially fulfilled.

According to an embodiment, the acquisition device comprises an array of photon sensors, the screen comprises an array of light display pixels, and the array of photon sensors covers the screen or is integrated to the array of display pixels.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
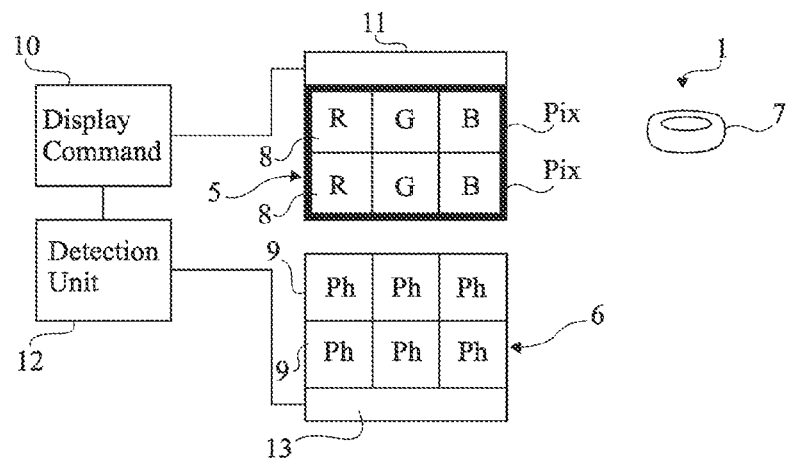
FIG. 1 partially and schematically shows an embodiment of a user interface system comprising a display screen and a device for detecting an actuation member on the display screen.

For clarity, the same elements have been designated with the same reference numerals in the various drawings and, further, the various drawings are not to scale. Further, only those elements which are useful to the understanding of the described embodiments have been shown and will be described. In particular, what use is made of the user interface systems described hereafter has not been detailed. It is within the abilities of those skilled in the art to use the provided interface systems in any type of device capable of being controlled via a touch-sensitive and/or contactless interface. Further, the means for processing the information provided by the user interface systems described hereafter and the means of connection with the device(s) to be controlled are within the abilities of those skilled in the art and are not described. In the following description, unless otherwise indicated, terms "substantially", "approximately", and "in the order of" mean "to within 10%".

In patent application WO 2011/119483, the presence of the light-emitting diodes and of the photodetectors at the periphery of the display screen increases the bulk of the user interface system. In particular, the thickness of the interface system should be sufficient to house the light-emitting diodes and photodetectors at the periphery of the display screen. Further, the efficiency of the detection may be decreased in the case of a strong ambient lighting, for example, in the case where sun beams directly hit the display screen.

In W. den Boer et al.'s publication, the detection of the actuation member on the display screen is obtained from the detection of the shadow of the actuation member on the display screen. The efficiency of the detection may be decreased in the case where the ambient lighting is low or nonexistent or in the case of strong variations of the ambient lighting.

It would be desirable to have a method of detection, by a user interface system, of the position of an actuation member on a display screen having an improved reliability, in particular in the case of a strong lighting and in the case of a low lighting.

Thus, an object of an embodiment is to provide a method of detection, by a user interface system, of the position of an actuation member on a display screen at least partly overcoming some of the disadvantages of existing methods.

Another object of an embodiment is to improve the reliability of the detection of the actuation member.

Another object of an embodiment is that for user interface device to be usable in strong lighting and low lighting conditions.

Another object of an embodiment is for the user interface system to comprise a device for detecting the position of the actuation member covering the display screen or integrated to the display screen.

Another object of an embodiment is for the device for detecting the position of the actuation member to operate with or without contact of the actuation member on the display screen.

Another object of an embodiment is for the detection method to be implemented with any type of display screen, particularly a liquid crystal display, a plasma screen, or a screen based on organic semiconductor components, for example, organic light-emitting diodes.

Another object of an embodiment is for the detection method to be capable of being implemented with any type of detection device based on photodetectors, particularly photodetectors formed by inorganic or organic semiconductor materials.

FIG. 1 shows an embodiment of a user interface system 1 comprising an emissive display screen 5 and a device 6 of contact or contactless detection of an actuation member 7. Actuation member 7 may correspond to a stylus, a user's finger or hand.

A pixel of an image corresponds to the unit element of the image displayed by screen 5. When screen 5 is a color image display screen, display screen 5 generally comprises for the display of each pixel of the image at least three components for emitting and/or regulating the light intensity, also called display sub-pixels, which each emit a light radiation substantially in a single color (for example, red, green, and blue). The superposing of the radiations emitted by the three display sub-pixels provides the observer with the color sensation corresponding to the pixel of the displayed image. In this case, the assembly formed by the three sub-display pixels used to display a pixel of an image is called display pixel of display screen 5. When screen 5 is a monochrome image display screen, display screen 5 generally comprises a single light source for the display of each pixel of the image.

Display screen 5 comprises an array of display sub-pixels 8 (R, G, B) for example distributed in rows and in columns. Two light display pixels Pix, each comprising three display sub-pixels, are shown in FIG. 1. A display pixel 5 may approximately comprise from 300,000 to 2,000,000 display pixels. Each display sub-pixel 8 comprises an electronic component capable of emitting a light signal and/or of regulating the intensity of the light signal crossing it and emitted by a light source which may be common to a plurality of display sub-pixels 8. Display screen 5 may be an LCD (Liquid Crystal Display) screen, a plasma screen, or a screen based on organic semiconductor components. As an example, in the case of an LCD screen, each display sub-pixel 8 may comprise liquid crystals capable of more or less letting through the light beam originating from a light source which may be common to a plurality of display sub-pixels.

Detection device 6 comprises an array of photon sensors 9 (Ph) or photodetectors, for example distributed in rows and in columns. As an example, only six photodetectors 9 are shown in FIG. 1. A photodetector 9 is an electronic component capable of delivering an electric signal which depends on the quantity of light received by photodetector 9. Photodetectors 9 may comprise photodiodes, photoresistors, phototransistors, etc. The number of photodetectors 9 may be smaller than or equal to the number of display sub-pixels 8. Preferably, the number of photodetectors 9 is equal to the number of display sub-pixels 8.

In FIG. 1, display screen 5 and detection device 6 are shown separately for clarity. However, photodetector array 9 may be integrated to display sub-pixel array 8. As a variation, photodetector array 9 may cover display sub-pixel array 8. Photodetectors 9 are protected so as not to directly receive the light emitted by the display screen and only receive the light due to the ambient lighting, that is, the light flow which reaches display screen 5 from the outside of display screen 5.

System 1 comprises a display control unit 10 (Display Command) connected to display screen 5 by a unit 11 for selecting display sub-pixels 8. Display control unit 10 comprises, for example, a memory into which a digital image can be stored. Digital image means the digital representation of an image. Preferably, the digital image comprises an array of digital values which depend on the type of color coding used. Control unit 10 provides display screen 5 with control signals capable of obtaining the display on the screen for displaying an image corresponding to the stored digital image. As an example, in the case of an LCD screen, unit 10 is capable of controlling the displaying of an image on screen 5 by selecting liquid crystals 9 blocking the passage of light or letting through light.

System 1 comprises a unit 12 (Detection Unit) for detecting actuation member 7 connected to photodetector array 9 by a unit 13 for selecting photodetectors 9. Selection units 11 and 13 may be at least partly common. Unit 12 for example comprises a memory into which a digital image obtained from signals delivered by photodetectors 9 can be stored.

According to an embodiment, system 1 is formed by using a conventional display screen 5 to which is added detection device 6. Photodetector array 9 then covers display sub-pixel array 8.

According to another embodiment, the structure of a conventional display screen may be modified to form photodetectors 9 directly at the level of display sub-pixels 8 of display screen 5. As an example, when display screen 5 corresponds to a liquid crystal display, detection device 6 may comprise photodetectors 9 such as described in US patent application 2010/0013793. When the display screen comprises organic light-emitting diodes, detection device 6 may comprise photodetectors 9 formed from organic semiconductor materials such as described in French patent application FR11/58607.

An embodiment will be described in further detail in the case of a color LCD screen. It should however be clear that the display screen may be of another type, for example, a plasma screen or a screen based on organic semiconductor components, for example, organic light-emitting diodes.

Figure 2:
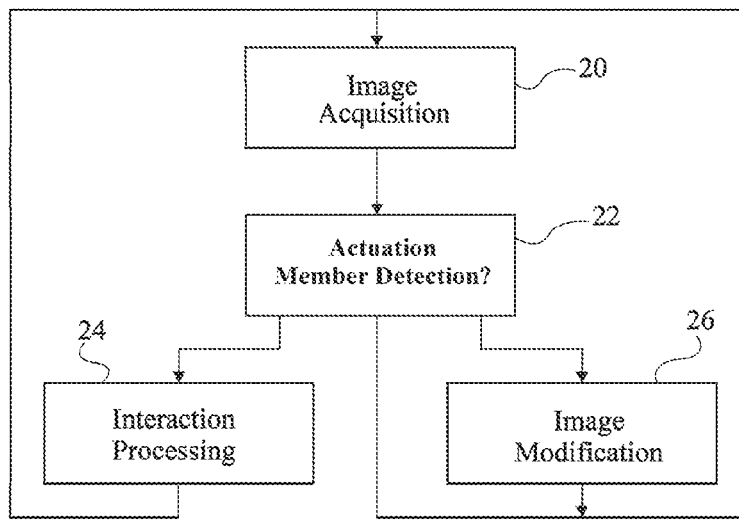
FIG. 2 illustrates, in the form of a block diagram, an embodiment of a method of detecting an actuation member on a display screen.

FIG. 2 shows, in the form of a block diagram, an embodiment of a method of detecting an interaction between an actuation member and a user interface system which may in particular be implemented with user interface system 1 shown in FIG. 1. A detection of an interaction between the actuation member and the user interface system corresponds to the detection of the position of the actuation member on the display screen (contact detection) or close to the display screen (contactless detection). At least steps 20, 22, 24 described hereafter may be implemented simultaneously to the display of successive images on screen 5.

At step 20, a new digital image is acquired by detection unit 12 from the signals delivered by photodetectors 9. Term image pixel designates an element of the array of an image. As an example, the digital value of an image pixel of the acquired image depends on the signal delivered by one of photodetectors 9.

The acquisition of new digital image may be performed at a frequency of 5 or 10 Hertz. It may be lower than the display frequency of new images on display screen 5. Further, the frequency of acquisition of new digital images may not be constant and may vary according to the nature of the steps carried out subsequently on implementation of the present embodiment of the detection method, as will be described in further detail hereafter. The method carries on at step 22.

At step 22, unit 12 determines whether the actuation member is detected on the acquired digital image. Generally, the presence of the actuation member is detected based on an analysis of the signals delivered by photodetectors 9. As an example, a variation of signals of photodetectors 9 due to the presence of the actuation member with respect to the level of these signals in the absence of the actuation member may be searched for. According to another example, a variation of signals of photodetectors 9 with respect to the signals of the last acquired digital image may be searched for. The search may be carried out for all the pixels of the acquired digital image or for some of them only. According to an embodiment, unit 12 determines conditions to be fulfilled so that the actuation member is detected in a certain fashion.

The result of an image analysis method for the search for the actuation member may be:

a certain detection of the actuation member when all detection conditions are fulfilled;

a certain absence of detection of the actuation member when no detection condition is fulfilled; or an uncertainty as the presence or the absence of the actuation member when the detection conditions are partially fulfilled.

If, at step 22, the actuation member is detected, the method carries on at step 24. If, at step 22, the actuation member is not detected, the method carries on at step 20 by the acquisition of a new digital image. If, at step 22, the detection of the actuation member is uncertain, the method carries on at step 26.

At step 24, the method carries on with an action which depends on the detected position of actuation member 7 relative to display screen 5. It may be any type of action according to the considered interface system. An example of action may comprise displaying a menu, etc. The method carries on at step 20.

At step 26, display unit 10 modifies the next displayed image with respect to the image which should have been displayed to improve the reliability of the detection of the actuation member by the search method implemented at step 22, that is, to obtain after the implementation of the search method at step 22 a certain detection or a certain absence of detection.

The modification brought to the image depends on the type of search algorithm used at step 22. A possibility of modification of the displayed image comprises, for the next displayed image, or for next displayed images, increasing or decreasing the level of the image pixels of the displayed image, of the entire image or only of a portion thereof. As an example, the level of at least certain display pixels of the next displayed image is increased or decreased by at least 0.5%, preferably by at least 1%, more preferably by at least 2%, in particular by at least 5%. Advantageously, the level variation of the image pixels is then not perceived or only slightly perceived by the observer. According to another example, the level of at least certain display pixels of the next displayed image is increased or decreased by at least 5%, preferably by at least 10%. This advantageously enables to increase the chances of a detection of the actuation member on the next acquired images. As an example, the level of less than 50%, preferably less than 25%, more preferably less than 15%, more preferably still less than 10%, of the display pixels of the next displayed image is increased or decreased with respect to the image pixels of the image which should have been displayed.

To avoid disturbing the user's vision, the modification may be performed on a small number of successive displayed images or may be performed intermittently. As an example, the modification is maintained at most over 100, preferably over 50, more preferably over 25, more preferably still over 10, images and is anyway interrupted if a certain detection or a certain absence of detection occurs. According to an example, if a certain detection or a certain absence of detection has not been determined when the total number of modified images to be displayed has been reached, then detection unit 12 determines that the absence of detection is certain.

As an example, when the modification of the displayed image is performed intermittently, the modification is performed on one image displayed out of two, three, or four images. According to an example, when the modification of the displayed image is performed intermittently, a digital image is acquired only after the displaying of a modified image. According to another example, when the modification of the displayed image is performed intermittently, images are acquired after the displaying of a modified image and after the displaying of an unmodified image. The image acquired after an unmodified image has been displayed may be subtracted from the image acquired after a modified image has been displayed, and the search for the actuation member may be carried out on the image thus obtained.

Further, the values of image pixels of the displayed image may be progressively increased or decreased, for example, by at least 1%, preferably by at least 2%, more preferably by at least 5%, more preferably still by at least 10% for each display of a new modified image, as long as an uncertain detection is obtained and until a threshold is reached. The threshold for example corresponds to a total variation of the image pixel level by 50%, or even 100% with respect to the image which should have been displayed.

As an example, if no certain detection or certain absence of detection has been determined when the threshold has been reached, then detection unit 12 determines that the absence of detection is certain. According to another example, when the threshold has been reached, modified images may keep on being displayed without however providing an additional variation of the level of the modified image pixels.

Further, in the case of an uncertain detection, the image acquisition frequency may be temporarily increased until a certain detection or a certain absence of detection is obtained. As an example, the image acquisition frequency may be temporarily multiplied by at least 2, preferably at least 3, more preferably at least 5, more preferably still at least 10. As an example, in the case where the image acquisition frequency in the case of a certain detection or a certain absence of detection is in the range from 5 to 10 Hz, the image acquisition frequency, in the case of an uncertain detection, may be temporarily increased up to from 50 to 100 Hz.

Figure 3:
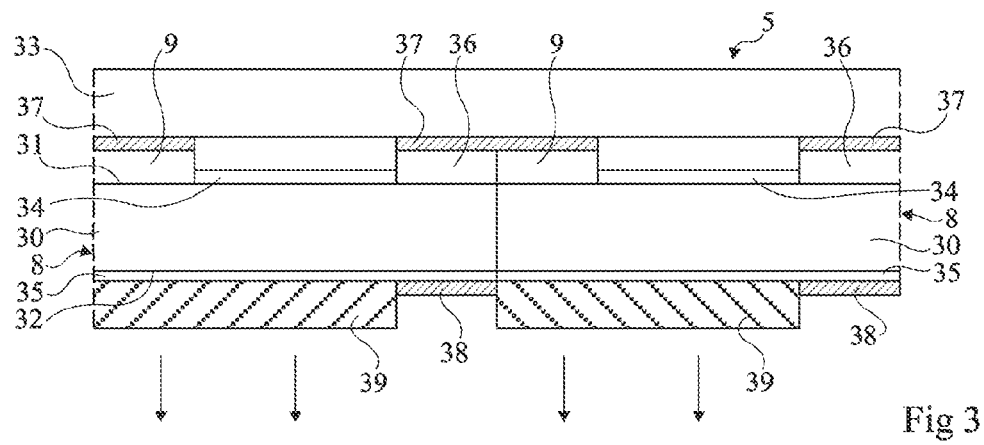
FIG. 3 is a partial simplified cross-section view of an embodiment of the display screen of the interface system of FIG. 1.

FIG. 3 shows an embodiment of display screen 5 of system 1 of FIG. 1 in the case of a color LCD screen. Two adjacent display sub-pixels 8 are shown in FIG. 1. As an example, each display pixel may have a square base with a side length typically in the order of 200 µm. As an example, each display pixel comprises three display sub-pixels 8 with a rectangular base having side lengths in the range from 50 µm to 200 µm, with a 20-µm spacing between the display sub-pixels, such a spacing being used for the addressing transistors and lines and the masking thereof, as described hereafter. Each display sub-pixel 8 comprises a liquid crystal block 30 which extends substantially across the entire surface of display sub-pixel 8. Liquid crystal array 30 defines two substantially parallel and opposite main surfaces 31, 32. A back-lighting device 33 is arranged on the side of surface 31. Back-lighting device 33 may be common to all display sub-pixels 8. As an example, back-lighting device 33 may comprise fluorescent tubes or light-emitting diodes. As an example, back-lighting device 33 emits white light which variably crosses each block 30 of liquid crystals according to the polarization of the crystals.

Electrodes 34 are arranged on surface 31 and electrodes 35 are arranged on surface 32. Electrodes 34, 35 are made of a transparent conductive material, for example, indium tin oxide or ITO. As an example, electrodes 35 form a continuous layer of a transparent conductive material covering the entire surface 32, which may also be completed by rows or columns formed of a non transparent material significantly less resistive than the transparent conductive material (for example, aluminum, silver, or copper) deposited on the spaces between display sub-pixels. Each liquid crystal block 30 may be made more or less opaque to the light flow provided by back-lighting device 33 by the application of a voltage between electrodes 34, 35 sandwiching liquid crystal block 30. Electrodes 34, 35 are selected by selection unit 11 which comprises, for each display sub-pixel 8, a selection block 36 arranged between back-lighting device 33 and liquid crystal block 30. Each selection block 36 may comprise one or a plurality of transistors.

Non-transparent portions 37 are arranged between back-lighting device 33 and selection blocks 36. Selection blocks 36 thus do not received the light emitted by back-lighting device 33. Non-transparent portions 38 are arranged on electrodes 35 substantially opposite each selection block 36. Selection blocks 36 thus do not receive light from the ambient lighting. Opaque portions 37, 38 are for example made of a metallic material.

Electrode 35 of each display sub-pixel 8 is covered with a portion 39 of a material capable of filtering the light waves which cross it according to the wavelength. Each portion 39 is for example formed with a colored resin. Portions 39 are called colored filters hereafter. As an example, each colored filter 39 covers the entire electrode 35 of display sub-pixel 8, except for the portion of electrode 35 covered with opaque portion 38. Preferably, each colored filter 39 is capable of preferably letting through the light waves in a wavelength range around a specific wavelength. As an example, three colored filers 39 associated with three different specific wavelengths may be used. The specific wavelengths may correspond to the wavelengths of primary colors or be close thereto. The three primary colors are, for example, red, green, and blue. Colored filters 39 may be distributed across the array of display sub-pixels 8 according to an alternation of the three colors along the rows or the columns.

For each display sub-pixel 8, photodetector 9 is arranged on surface 31 and is schematically shown in FIG. 3 as a block. As an example, each photodetector 9 may be contained within a square having a 20-µm side length. As an example, the photodetector 9 associated with a display sub-pixel 8 may be adjacent to selection block 36 associated with an adjacent display sub-pixel 8. Advantageously, for an LCD screen, photodetectors 9 may be made in the form of phototransistors. Such an embodiment has the advantage of not modifying the technology used to form the LCD screen addressing array.

Opaque portions 37 are interposed between back-lighting device 33 and photodetector 9. Photodetectors 9 thus do not receive the light emitted by back-lighting device 33. Opaque portions 38 are not located opposite photodetectors 9. For each display sub-pixel 8, colored filter 39 also extends opposite photodetector 9 of display sub-pixel 8. Each photodetector 9 thus receives the light originating from the ambient lighting after filtering by color filter 39 of display sub-pixel 8.

Figure 4:
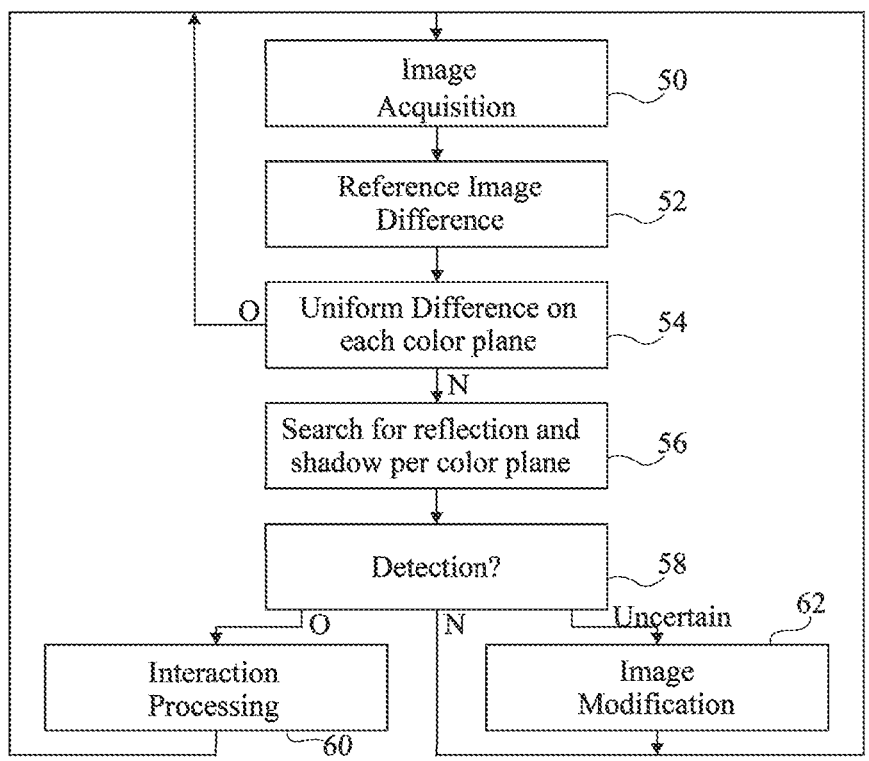
FIG. 4 illustrates, in the form of a block diagram, a more detailed embodiment of a method of detecting an actuation member on a display screen.

FIG. 4 illustrates, in the form of a block diagram, a more detailed embodiment of a method of detecting an interaction between an actuation member and a user interface system, which may in particular be implemented with user interface system 1 shown in FIG. 1 in the case where display screen 5 is a color screen. A detection of an interaction between the actuation member and the user interface system corresponds to the detection of the position of the actuation member on the display screen (contact detection) or close to the display screen (contactless detection).

At step 50, a new digital image is acquired by detection unit 12 as previously described for step 20 of the method illustrated in FIG. 2. Preferably, each digital image may divide into three digital sub-images, each sub-image being obtained from the signals delivered by photodetectors 9 of display sub-pixels 8 associated with one of the three previously-described specific wavelengths. In the following description, term "image" is used to designate, in a given color plane, the sub-image associated with this color. As an example, the three sub-images associated with primary colors red, green, and blue are considered. "Color pixel" is used to designate an element of the array of a sub-image. As an example, the digital value of a color pixel depends on the signal delivered by one of photodetectors 9. According to the distribution of colored filters 39, the sub-images may have a different number of color pixels. However, preferably, the sub-images have the same number of color pixels. The method carries on at step 52.

The principle of the present embodiment of the detection method is based on the fact that the digital value of each color pixel can be divided into a first component and a second component.

The first component is representative of the light flow of the ambient lighting which reaches display screen 5. In the absence of an actuation member arranged in contact with display screen 5 or sufficiently close to display screen 5, the acquired digital image only depends on the characteristics of the ambient lighting light sources. In particular, if the ambient lighting is fixed, the successively-acquired digital images are substantially identical in the absence of the actuation member. When the actuation member is in contact with the display screen or close to the display screen, the first component is further representative of the shadow due to the interposition of the actuation member between the light sources of the ambient lighting and display screen 5.

The second component is representative of the reflection of the image displayed by display screen 5. In the absence of an actuation member, the reflection signal is extremely low and blends into the ambient lighting. Indeed, it can be considered that display screen 5 acts as a light source having its light diffused by the objects around display screen 5 and can be detected by photodetectors 9. In the presence of an actuation member which interacts with display screen 5, with or without contact, the second component increases in the area where the actuation member is close to display screen 5 due to the reflection of the image displayed on the actuation member. Further, the closer the actuation member is to the display screen, the closer the reflected image is to the image at least locally displayed in the area where the actuation member is close to display screen 5.

Steps 52 to 58 described hereafter illustrate a more detailed embodiment of previously-described step 22.

At step 52, detection unit 12 determines a modified digital image by calculating the difference between the acquired digital image and a reference digital image. The difference may be performed color pixel per color pixel for each color plane. According to an embodiment, the reference image corresponds to the digital image acquired in the absence of interaction between the actuation member and display screen 5. The method carries on at step 54.

At step 54, detection unit 12 determines, for each color plane of the modified image, whether the values of the color pixels are substantially constant. If they are, this means that the acquired digital image is only slightly different from the reference image and that there thus is no interaction between the actuation member and display screen 5. The method then carries on at step 50 with the acquisition of a new digital image. The reference image can then correspond to the last acquired digital image or to the average, color pixel per color pixel, of the last digital images acquired with no interaction. If the levels of the color pixels are not constant, this means that the acquired digital image is different from the reference image. The method then carries on at step 56.

At step 56, detection unit 12 searches whether there is an interaction between the actuation member and display screen 5 according to at least one search algorithm, particularly from among the first or second search algorithms described hereafter, and preferably according to at least two search algorithms, particularly the first and second search algorithms described hereafter.

The first search algorithm comprises searching for the reflection of a portion of the image displayed on the actuation member to deduce therefrom information representative of the position of the actuation member relative to display screen 5. Preferably, the first algorithm is implemented separately for each color plane. According to an embodiment, detection unit 12 searches, in each color plane, whether there is a local correlation between the acquired digital image and the digital image associated with the displayed image.

More specifically, according to an embodiment, detection unit 12 determines, in each color plane, a modified displayed image based on the displayed digital image and a modified acquired image based on the acquired digital image. Each color pixel of the modified displayed image corresponds to the value of this color pixel of the displayed digital image decreased by the average value of all the color pixels of the same color plane. Each color pixel of the modified acquired image corresponds to the value of this image pixel of the acquired digital image decreased by the average value of all the color pixels of the same color plane.

Detection unit 12 may further determine for each color plane a working image for which the digital value of each color pixel is equal to the difference between the digital value of the same color pixel of the modified displayed image and the digital value of the same color pixel of the modified acquired image. In the case of an interaction, the digital values locally decrease in the image area where the interaction occurs.

Detection unit 12 may search in the working image known patterns according to the expected shape of the actuation member. This advantageously enables to obtain a filtering of the detected actuation member according to its shape and to avoid a wrong detection in the case where an object in contact with or close to the display screen does not have the expected shape. As an example, this enables to avoid detecting the palm of the user's hand when a detection of a finger or of a plurality of fingers of the user is expected. An example of a method comprises determining the correlation between the working image and the pattern for different positions of the pattern with respect to the working image. A detection for example occurs in the case where the correlation is higher than a given detection threshold. As an example, a single interaction between the actuation member and the screen may be searched for. In this case, the position of the pattern relative to the working image for which the correlation between the working image and the pattern is maximum may be searched for. According to another example, a plurality of interactions between the actuation member and the screen may be simultaneously searched for. This is for example true when the user can use a plurality of fingers to interact with the screen. In this case, the position of the pattern relative to the working image for which the correlation between the working image and the pattern is maximum may be searched for.

Detection unit 12 may determine, based on the position(s) of the pattern relative to the working image for which the correlation is maximum, the detection position or the detection positions of the actuation member relative to display screen 5.

As an example, when the actuation member has not been detected yet, detection unit 12 may determine the correlation between the working image and the pattern for all possible positions of the pattern relative to the working image. When the actuation member has been detected, detection unit 12 may first determine the correlation between the working image and the pattern only for positions close to the last position of the pattern or the last positions of the pattern relative to the working image for which the correlation has been maximum, possibly locally, or higher than the detection threshold. If no detection has occurred, the search may be carried on across the entire working image.

The second search algorithm comprises searching for the shadow of the actuation member on the acquired digital image. Preferably, the second algorithm is implemented separately for each color plane. According to an embodiment, detection unit 12 searches, in each color plane, for a local minimum of the values of the color pixels, for example, according to a specific pattern, which is representative of the shadow of the actuation member. A detection for example occurs if the minimum is lower than a given threshold. Detection unit 12 can determine, based on the position of the minimum with respect to the working image, the position of detection of the actuation member relative to display screen 5. The method carries on at step 58.

As an example, when the actuation member has not been detected yet, detection unit 12 may search for the local minimum across the entire acquired digital image. When the actuation member has been detected, detection unit 12 may first search for the local minimum only for positions of the acquired digital image close to the last detected position of the local minimum. If no detection has occurred, the search may be carried on across the entire acquired digital image.

Further, when the actuation member has not been detected yet in a given color plane, the detection unit may further search for the actuation member, by implementing the first or of the second previously-described algorithm, at the position or at the positions where it has been detected in another color plane.

At step 58, detection unit 12 determines whether a certain detection, an uncertain detection, or an absence of detection is obtained after the implementation of the first search algorithm, and possibly of the second search algorithm. Detection unit 12 can determine, for the first search algorithm, whether the actuation member has been detected at a same position relative to the display screen for the three color planes. If this is true, the detection of the actuation member is certain and the method carries on at step 60. Similarly, for the second search algorithm, detection unit 12 may determine whether the shadow of the actuation member on display screen 5 is detected at the same location for the three color planes. If this is true, the detection of the actuation member is certain and the method carries on at step 60. In the case where no reflection has been detected by the first search algorithm for any color plane or no shadow has been detected by the second search algorithm for any color plane, the absence of detection is certain and the method carries on at step 50. In the other cases, the detection is uncertain and the method carries on at step 62.

An example of uncertain detection occurs if, on implementation of each algorithm, there is at least one color plane for which no detection has been obtained and at least one color plane for which a detection has been obtained. Another example of uncertain detection occurs if, on implementation of the first and/or of the second algorithm, a detection has been obtained for the three color planes corresponding to different positions of detection of the actuation member relative to display screen 5.

At step 60, the method carries on with an action according to the position of detection of the actuation member relative to display screen 5 as previously described for step 24 of the method illustrated in FIG. 2. The method carries on at step 50.

At step 62, display unit 10 modifies the next displayed image with respect to the image which should have been displayed to improve the reliability of the detection of the actuation member as previously described for step 26 of the method illustrated in FIG. 2.

In the case of an uncertain detection originating from the implementation of the first detection algorithm, the absence of detection of the reflection of the displayed image in a color plane may be due to a low reflection for this color or to an ambient lighting which masks the reflection for this color. A possibility of modification of the displayed image then comprises, for the next displayed image, or for next displayed images, increasing the level of the color pixels of the displayed image in the color plane where the detection is uncertain.

In the case of an uncertain detection originating from the implementation of the second detection algorithm, the absence of detection of the shadow of the actuation member in a color plane may be due to a compensation of the shadow by the reflection of the displayed image for this color. A possibility of modification of the displayed image then comprises, for the next displayed image, or for next displayed images, decreasing the values of the color pixels of the image in the color plane or in the color planes where the shadow is expected and has not been detected.

In the case of an uncertain detection originating from the implementation of the first or of the second algorithm, the level of the color pixels in the color plane may be increased or decreased locally only, at the position or at the positions where the actuation member has been detected in the other color planes. Further, the color pixel level may also be increased in a color plane where a detection has been performed, in the entire color plane or only locally at the position of the detection.

To avoid disturbing the user's vision, the modification may be performed on a small number of successive images or may be performed intermittently, for example, one image out of two or out of three. In this last case, the first search algorithm is only implemented when the displayed image is modified. Further, the modification of the values of color pixels may be performed for all the color pixels of the color plane or only for the color pixels of the portion of the color plane where the shadow is expected. Further, the values of color pixels of the displayed image may be progressively increased or decreased, for example, by at least 5% for each display of a new image, as long as an uncertain detection is obtained and until a threshold has been reached. If no certain detection has been determined when the threshold has been reached, then detection unit 12 determines that there is an absence of detection. In the case of an uncertain detection, the image acquisition frequency may be temporarily increased until a certain detection or the absence of detection is obtained to accelerate the determination of the certain detection or of the absence of detection. More generally, in the case of a certain or uncertain detection, the image acquisition frequency may be temporarily increased until the end of the detection of the actuation member. This enables to fluidly and rapidly detect changes of the actuation member without however excessively using detection unit 12 in the absence of a detection.

According to an embodiment, at step 50, the acquired digital image may be used to determine the ambient lighting intensity. The intensity of the ambient lighting can be obtained by determining the luminance of the acquired digital image. When the acquired digital images are coded in the RGB color space, the intensity of the ambient lighting can be obtained by performing a matrix transformation of the acquired digital image from the RGB color space to the XYZ space and by using the value of luminance Y. According to an embodiment, the luminosity of the image displayed by display screen 5 may be modified according to the average value of luminance Y of the color pixels of the acquired digital image.

According to an embodiment, at step 50, the acquired digital image may be used to determine the general color of the ambient lighting. The general color of the ambient lighting can be obtained by determining the general color of the acquired digital image. When the acquired digital images are coded in the RGB color space, the general color of the ambient lighting can be obtained by performing a matrix transformation of the acquired digital image from the RGB color space to the HSV space and by using the value of hue H. According to an embodiment, the luminosity of the image displayed by display screen 5 may be modified according to the average value of hue H of the color pixels of the acquired digital image.

The brightness or color modifications may be achieved generally or locally. It is indeed possible to perform a local correction of the brightness or of the color of the displayed image. As an example, in the case where the sun only hits a portion of display screen 5, the brightness of the displayed image may be locally increased on this portion only.

Advantageously, the first search algorithm is not disturbed in case of a low ambient lighting and the second search algorithm is not disturbed in case of a strong ambient lighting. Advantageously, the detection reliability of the method according to the embodiment where the first and second algorithms are implemented is thus improved.

Figure 5:
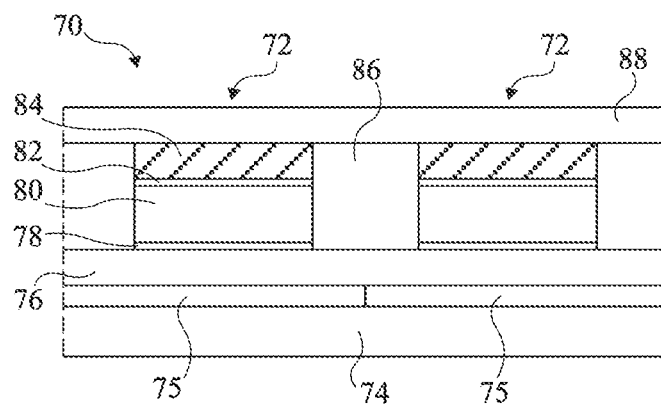
FIG. 5 is a partial simplified cross-section view of an embodiment of the device for detecting the actuation member of the interface system of FIG. 1.

FIG. 5 is a partial simplified cross-section view of an embodiment of photodetectors 9 which is particularly adapted to the case where the photodetectors belong to a detection device 70 attached to a display screen. FIG. 5 shows two photodetectors 72. Photodetectors 72 may be distributed in rows and in columns. In operation, each photodetector 72 partially covers a display sub-pixel 8 of display screen 5.

Photodetectors 72 are formed on a surface of a transparent or translucent dielectric support 74 or substrate, for example, made of glass or plastic.

Each photodetector 72 comprises a stack comprising, in the following order from support 74:
 a colored filter 75 filtering the light rays similarly to the colored filter of the display sub-pixel covered with photodetector 72;
 a transparent electrode 76, for example, made of transparent conductive oxide or TCO, for example, made of indium tin oxide or ITO;
 an electron injection portion 78, for example, made of heavily-doped transparent organic semiconductor polymer or of a transparent conductive metal oxide, for example, of ZnO type;
 a portion 80 made of a mixture of organic semiconductor polymers, for example poly(3-hexylthiophene) or poly (3-hexylthiophene-2,5-diyl) (P-type semiconductor), known as P3HT, mixed with [6,6]-phenyl-$C_{61}$-butyric acid methyl ester (N-type semiconductor), known as PCBM;
 a portion 82 of heavily-doped organic semiconductor polymer (hole injection layer), for example, a polymer known as PEDOT:PSS, which is a mixture of poly(3, 4)-ethylenedioxythiophene and of sodium polystyrene sulfonate; and
 an electrode 84, for example, made of aluminum or silver.

Laterally, the semiconductor regions 80 of photodetectors 72 are separated from one another by a transparent dielectric material 86. Further, a transparent protective coating 88 covers the upper surface of the array (on the side of electrode 84).

According to a variation, colored filters 75 are not present. In this case, each photodetector 72 is formed with a spectral response adapted to the color to be detected. This may be obtained by adjustment of the polymer components used and of the thicknesses of the layers forming photodetector 72.

In this example, photodetectors 72 are intended to be illuminated by the ambient lighting through transparent substrate 74 and through transparent layers 76 and 78. Device 70 may cover display screen 5 on the side of coating 88, each photodetector 72 being placed above a black area of screen 5 or being masked by metal tracks of a display sub-pixel of screen 5 to avoid directly receiving light from screen 5.

Transparent electrodes 76 may have, in top view, the shape of parallel strips. In this case, opaque electrodes 84 may correspond to parallel strips, each strip 84 being connected to all the photodetectors of a same row of detection device 70 and transparent strips 76 extend perpendicular to the rows and are connected to photodetectors of different rows. As a variation, electrodes 76 may belong to a plate of the transparent conductive material in contact with all photodetectors 72.

Photodetectors 72 of detection device 70 may be formed by printing techniques. The materials of previously-described layers 78 to 88 may be deposited in liquid form, for example, in the form of conductive and semiconductor inks by means of inkjet printers. "Materials in liquid form" here also designates gel materials capable of being deposited by printing techniques. Anneal steps may be provided between the depositions of the different layers, but the anneal temperatures may not exceed 150° C., and the deposition and the possible anneals may be performed at the atmospheric pressure.

The forming of organic semiconductor components by printing techniques is for example described in article "CEA-LITEN S2S printing platform for Organic CMOS and Sensors Devices" by Jean-Yves Laurent et al., LOPE-C Conference, June 2011, Frankfurt.

Figure 6:
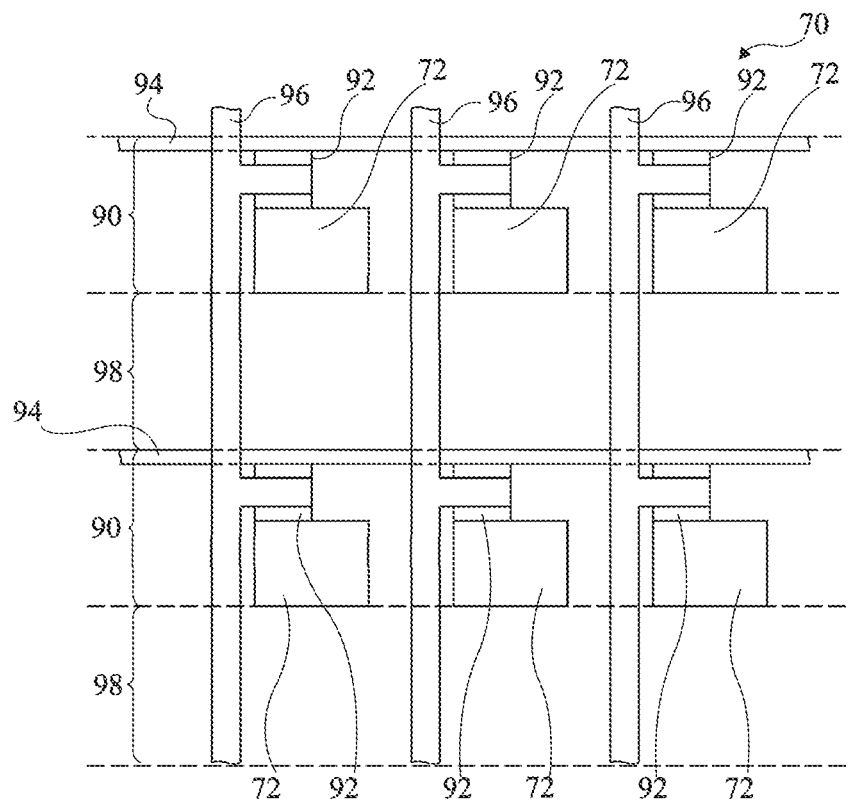
FIG. 6 is a partial simplified front view of the detection device of FIG. 5.

FIG. 6 is a simplified top view of detection device describing in further detail the means for selecting photodetectors 72. FIG. 6 partially and schematically shows two rows 90, each comprising three photodetectors 72. A selection element 92 is associated with each photodetector 72. Selection element 92 may correspond to an organic thin film transistor (OTFT). One of the terminals among the source and the drain of transistor 92 is connected to electrode 84 of photodetector 72 and the other terminal among the source and the drain is connected to a conductive track 94. Conductive track 94 may be connected to all the selection elements 92 of a row 90. Track 94 may be made of an opaque material, for example, of metal. The gate of each transistor 92 may be controlled by a signal transmitted by a track of a transparent conductive material extending along a direction perpendicular to rows 90. Track 96 may be connected to transistors 88 of different rows 90.

In the case where detection device 70 covers a display screen 5, two adjacent rows 90 are spaced apart by a row 98 of a transparent material to let through the light flow originating from display screen 5. Preferably, rows 90 have a width smaller than the width of rows 98 to avoid obstructing a user's vision of display screen 5.

In the case where detection device 70 is integrated to display screen 5, display sub-pixels 8 of display screen 5 are formed in each row 98.

According to another embodiment, be it in the case where the detection device is integrated to the display screen or covers it, the touch display screen may comprise a lenticular screen covering detection device 70. The lenticular screen may correspond to the lenticular screen described in French patent application FR12/58546.

The lenticular screen for example comprises adjacent cylindrical lenses which extend parallel to rows 90 and 98. They may be plano-convex cylindrical lenses. The width of each lens is substantially equal to the sum of the widths of row 90 and of row 98. The focal distance of each lens is adjusted so that row 90 is approximately at the secondary focus of the lens. The lenticular screen is placed relative to rows 90 and 98 so that a lens covers a row 98 across the entire width thereof and at least a portion of the width of at least a row 90 of photodetectors.

Each lens deviates the light rays emitted through row 98 or collected by row 90 (which forms a dark area). The light rays originating from a row 98 are only slightly deviated and their directions remain relatively close to the optical axis while the light rays reflected by a photodetector row 90 are deviated in a direction strongly deviating from the optical axis. Thereby, a user only perceives light rays originating from display sub-pixel rows 98 and does not perceive the dark area of photodetector rows 90. The user thus only sees the image diffused by display screen 5 and does not see detection device 70.

Light rays having a significant inclination relative to the display screen tend to be deviated by the lenses and to be received by the photodetectors of detection device. The detection of the actuation member which is close to the lenticular screen may be based on the detection of the presence or of the absence of such grazing light rays. The operation of detection device 70 is thus not disturbed by the presence of the lenticular screen.

In the previously-described embodiments, photodetectors 9 capable of capturing light waves of the ambient lighting in a wavelength range which may be different from the wavelength range of interest, for example, around a primary color, have been considered. Colored filters are then arranged between the ambient lighting light sources and the photodetectors to only let through light waves having their wavelengths in the range of interest. However, each photodetector 9 may be designed to only detect light waves in the wavelength range of interest which may be different from one photodetector to the other. In this case, the colored filters may be absent.

In previously-described embodiments, method steps may be carried out by using one or a plurality of computing devices. The embodiments are thus not limited to an operation with a specific type of computing device.

Figure 7:
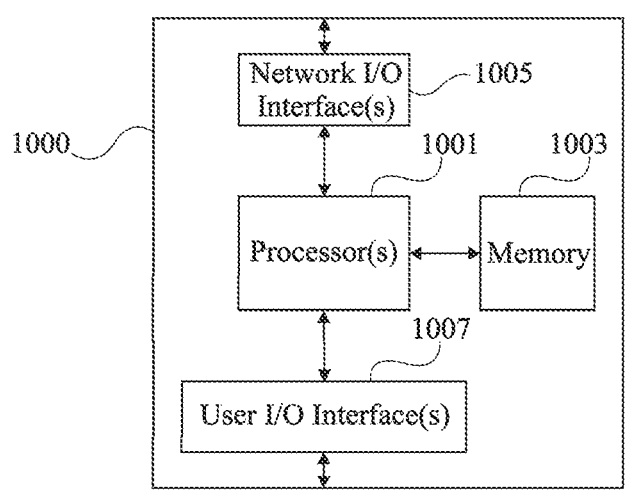
FIG. 7 partially and schematically shows an embodiment of the unit for detecting the interface system of FIG. 1.

FIG. 7 is a block diagram of a computing device 1000 which may be used to form detection unit 12 and/or display control unit 10. Computing device 1000 may comprise one or a plurality of processors 1001 and one or a plurality of non-transient computer-readable storage supports (for example, memory 1003). Memory 1003 may store, in non-transient computer-readable storage means, computer program instructions which, when executed, implement the steps of the above-described detection method. Processor or processors 1001 may be coupled to memory 1003 and may execute these computer program instructions to cause the carrying out of these steps.

Computing device 1000 may also comprise a network input/output interface 1005 (Network I/O Interface(s)) through which the computing device can communicate with other computing devices (for example, over a network), and may also comprise one or a plurality of user interfaces 1007 (USER I/O Interface(s)) through which the computing device can provide an output signal to a user and receive an input signal from the user. The user interfaces may comprise peripherals such as a keyboard, a mouse, a microphone, a display peripheral (for example, a monitor or a touch screen), loudspeakers, a camera, and/or various other types of input/output peripherals.

The above-described embodiments can be implemented in several ways. As an example, the embodiments may be implemented by means of a dedicated circuit, of software, or of a combination thereof. When they are implemented by software, the software code may be executed on any suitable processor (for example, a microprocessor) or a set of processors, be they provided in a single computing device or distributed between a plurality of computing devices. It should be noted that any component or component assembly which carries out the previously-described method steps can be considered as one or a plurality of controllers which control the above-described steps. The controller or the controllers may be implemented in many ways, for example, with a dedicated electronic circuit or with a general-purpose circuit (for example, one or a plurality of processors) which is programmed by means of software or of a microcode to execute the above-described method steps.

In this respect, it should be noted that an embodiment described herein comprises at least one computer-readable storage medium (RAM, ROM, EEPROM, flash or another memory technology, CD-ROM, digital video disk (DVD) or another optical disk support, magnetic cassette, magnetic tape, magnetic storage disk or another magnetic storage device, or another non-transient computer-readable storage support) coded with a computer program (that is, a plurality of executable instructions) which, when executed on a processor or a plurality of processors, carries out the steps of the above-described embodiments. The computer-readable medium may be portable so that the program stored thereon can be loaded on any computing device to implement aspects of the techniques described herein. It should further be noted that the reference to a computer program which, when executed, carries out one of the above-described method steps, is not limited to an application program executed on a host computer. On the contrary, terms "computer program" and "software" are used herein in a general sense to refer to any type of computer code (for example, application software, firmware, a microcode, or any form of computer instructions) which may be used to program one or a plurality of processors to implement aspects of the previously-described methods.

Specific embodiments have been described. Various alterations and modifications will occur to those skilled in the art. In particular, although an embodiment has been described where two search algorithms have been implemented, it is possible to only implement the algorithm for searching for the reflection of the image displayed by the actuation member.

The invention claimed is:

1. A method comprising the steps of:
    displaying successive first images on a screen;
    acquiring at least one second image, the second image being a color image comprising at least two sub-images associated with different colors;
    searching for a position of at least one actuation member relative to the screen based on a detection, in each sub-image, of a reflection of the first image by the actuation member or a shadow of the actuation member by determining whether conditions of determination of the position of the actuation member in the second image are fulfilled, the conditions of determination of the position of the actuation member being fulfilled if the reflection of the first image by the actuation member is detected at a same position in each sub-image or if the shadow of the actuation member is detected at the same position in each sub-image; and
    modifying at least one of next first images to be displayed if the conditions of determination of the position of the actuation member in the second image are only partially fulfilled, the conditions of determination of the position of the actuation member being only partially fulfilled if the reflection of the first image by the actuation member is detected in at least one of the sub-images and is not detected in all sub-images or if the shadow of the actuation member is detected in at least one of the sub-images and is not detected in all sub-images.

2. The method of claim 1, wherein the second image corresponds to the image of light reaching the screen.

3. The method of claim 1, wherein an intensity of at least certain pixels of the next first image to be displayed is increased or decreased.

4. The method of claim 1, wherein a portion only of the next first image to be displayed is modified.

5. The method of claim 1, comprising searching in each sub-image for at least one first given pattern representative of the reflection of the first image by the actuation member.

6. The method of claim 1, comprising searching in each sub-image for at least one second given pattern representative of the shadow of the actuation member.

7. A system comprising:
    a screen for displaying successive first images;
    a device of acquisition of at least one second image, the second image being a color image comprising at least two sub-images associated with different colors;
    a device for searching for a position of at least one actuation member relative to the screen based on a detection, in each sub-image, of a reflection of the first image by the actuation member or a shadow of the actuation member by determining whether conditions of determination of the position of the actuation member in the second image are fulfilled, the conditions of determination of the position of the actuation member being fulfilled if the reflection of the first image by the actuation member is detected at a same position in each sub-image or if the shadow of the actuation member is detected at the same position in each sub-image; and
    a device for modifying the next first images to be displayed if conditions of determination of the position of the actuation member in the second image are only partially fulfilled, the conditions of determination of the position of the actuation member being only partially fulfilled if the reflection of the first image by the actuation member is detected in at least one of the sub-images and is not detected in all sub-images or if the shadow of the actuation member is detected in at least one of the sub-images and is not detected in all sub-images.

8. The system of claim 7, wherein the acquisition device comprises an array of photon sensors, wherein the screen comprises an array of light display pixels and wherein the array of photon sensors covers the screen or is integrated to the display pixel array.

* * * * *